(12) United States Patent
Bleckmann et al.

(10) Patent No.: US 6,830,639 B2
(45) Date of Patent: *Dec. 14, 2004

(54) METHOD AND APPARATUS FOR PRODUCING FOLDED LABELS HAVING ROUNDED CORNERS

(75) Inventors: Frederick Bleckmann, Dover, NH (US); Gilbert A. Bleckmann, Pittsfield, NH (US)

(73) Assignee: Pittsfield Weaving Co., Inc., Pittsfield, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/143,867

(22) Filed: May 14, 2002

(65) Prior Publication Data

US 2002/0176730 A1 Nov. 28, 2002

Related U.S. Application Data

(60) Provisional application No. 60/290,814, filed on May 14, 2001.

(51) Int. Cl.[7] .......................... B32B 31/18; B32B 31/16; B32B 31/00
(52) U.S. Cl. .................. 156/73.3; 156/73.1; 156/580.1; 156/580.2
(58) Field of Search ................................ 156/510, 353, 156/580.1, 73.1, 580.2, 73.3, 530, 253, 513, 153, 64, 358; 53/399, 449, 552; 604/402; 400/615.2; 101/35; 340/572.1; 428/452.8

(56) References Cited

U.S. PATENT DOCUMENTS

| | | | | |
|---|---|---|---|---|
| 3,392,077 A | * | 7/1968 | Brieske et al. .............. 156/253 |
| 3,416,398 A | * | 12/1968 | Bodine, Jr. ................... 83/523 |
| 3,562,041 A | * | 2/1971 | Robertson ................... 156/73.1 |
| 3,697,357 A | * | 10/1972 | Obeda ......................... 156/510 |
| 3,939,033 A | * | 2/1976 | Grgach et al. .............. 156/515 |
| 4,157,719 A | * | 6/1979 | DeWoskin ................... 604/402 |
| 4,310,978 A | * | 1/1982 | Stern ........................... 40/600 |
| 4,474,637 A | * | 10/1984 | Kempf ..................... 156/380.5 |
| 4,491,491 A | * | 1/1985 | Stumpf ...................... 156/73.3 |
| 4,500,372 A | * | 2/1985 | Mion ......................... 156/73.3 |
| 4,618,516 A | * | 10/1986 | Sager ....................... 428/542.8 |
| 4,752,351 A | * | 6/1988 | Lunt ........................ 156/580.1 |
| 4,847,934 A | | 7/1989 | Weber ....................... 121/42 R |
| 4,863,542 A | * | 9/1989 | Oshefsky et al. ........... 156/160 |
| 4,935,282 A | * | 6/1990 | Pawlowski et al. ......... 428/121 |
| 5,197,722 A | * | 3/1993 | Adamski et al. .............. 270/32 |
| 5,230,761 A | * | 7/1993 | Crawford .................. 156/73.3 |

(List continued on next page.)

FOREIGN PATENT DOCUMENTS

DE  26 24 055 A1 * 2/1978 ............. G09F/3/02
WO  WO 00 50239  8/2000

Primary Examiner—Andrew H. Hirshfeld
Assistant Examiner—Wasseem H. Hamdan
(74) Attorney, Agent, or Firm—Nixon Peabody LLP

(57) ABSTRACT

The present invention includes a method and apparatus for producing individual folded labels. The method includes the steps of providing a ribbon of labels and folding the ribbon of labels so as to form at least one folded portion. The folded ribbon is subjected to sufficient heat and pressure to set the at least one folded portion. The ribbon of labels is advanced to a cutting device and subdivided into individual folded labels with an ultrasonic cutting device. Immediately prior to cutting, the advance of the ribbon of labels is paused to allow the material to partially melt and flow prior to being subdivided. The corners of the label can also be rounded to provide improved comfort for the wearer.

10 Claims, 22 Drawing Sheets

U.S. PATENT DOCUMENTS

| | | | | |
|---|---|---|---|---|
| 5,368,464 A | * | 11/1994 | Stewart et al. | 425/174.2 |
| 5,435,863 A | * | 7/1995 | Frantz | 156/64 |
| 5,512,132 A | * | 4/1996 | Stewart et al. | 156/73.3 |
| 5,545,275 A | * | 8/1996 | Herrin et al. | 156/73.1 |
| 5,745,036 A | * | 4/1998 | Clare | 340/572.1 |
| 5,785,181 A | * | 7/1998 | Quartararo, Jr. | 209/3.3 |
| 5,785,806 A | * | 7/1998 | Engle et al. | 156/580.2 |
| 5,863,383 A | * | 1/1999 | Bussey | 156/530 |
| 5,874,896 A | * | 2/1999 | Lowe et al. | 340/572.1 |
| 5,874,902 A | * | 2/1999 | Heinrich et al. | 340/10.51 |
| 5,932,041 A | * | 8/1999 | Dolling et al. | 156/73.3 |
| 5,948,208 A | * | 9/1999 | Speich | 156/580.2 |
| 6,176,953 B1 | * | 1/2001 | Landreth et al. | 156/73.3 |
| 6,258,142 B1 | * | 7/2001 | Holt et al. | 55/378 |
| 6,277,224 B1 | * | 8/2001 | Muesch et al. | 156/73.3 |
| 6,432,235 B1 | * | 8/2002 | Bleckmann et al. | 156/73.1 |
| 6,493,898 B1 | * | 12/2002 | Woods et al. | 15/209.1 |
| 6,645,330 B2 | * | 11/2003 | Pargass et al. | 156/73.1 |

* cited by examiner

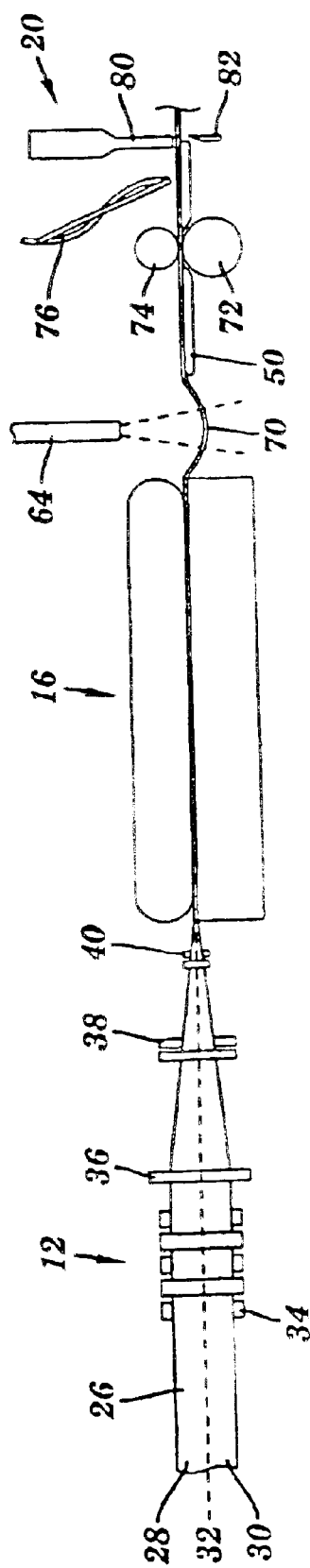
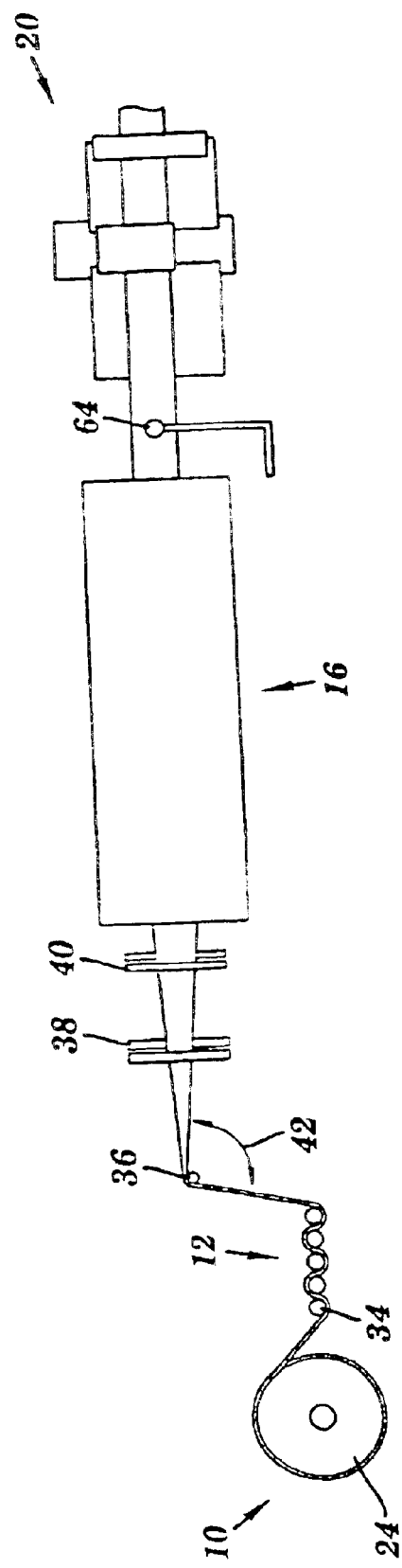

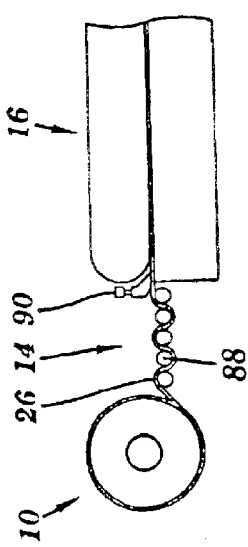
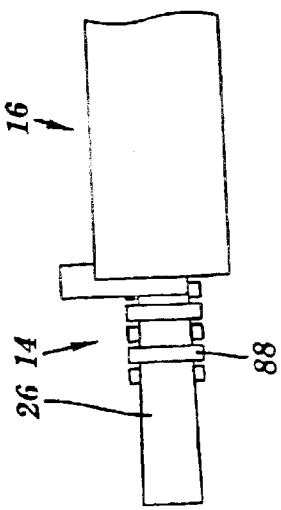
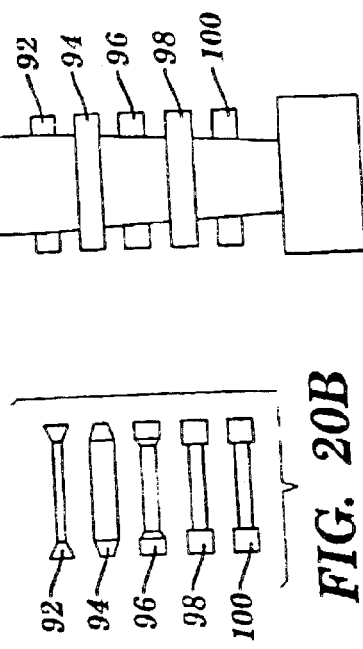
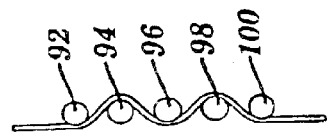
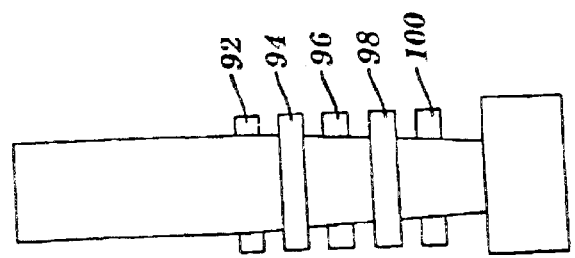

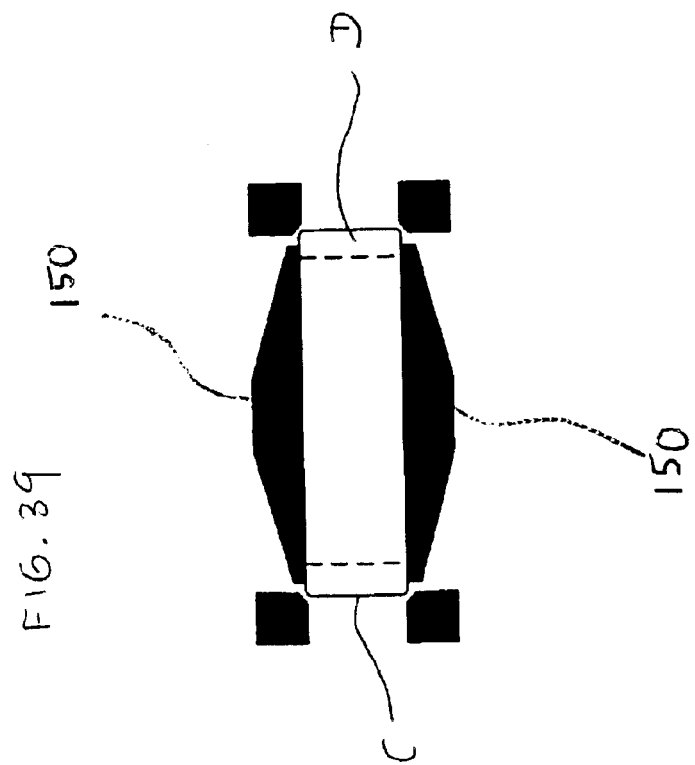
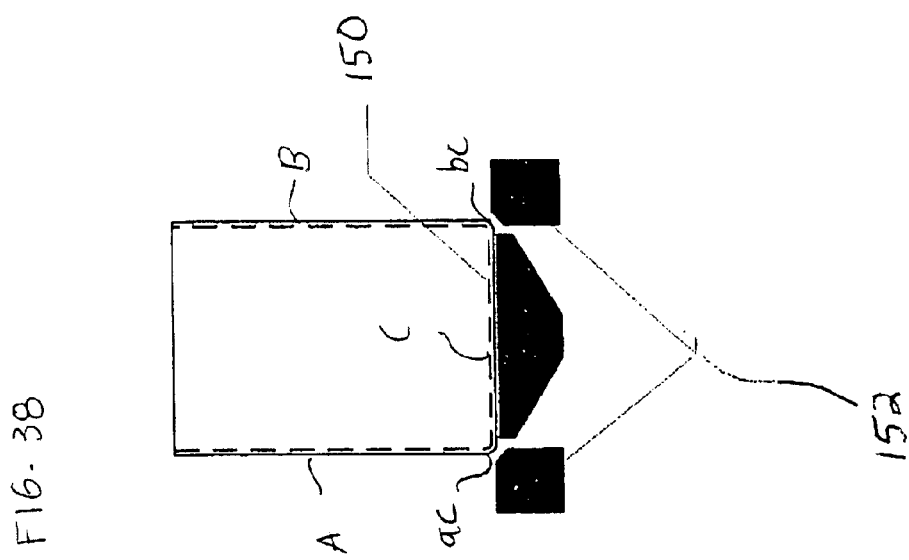

METHOD AND APPARATUS FOR PRODUCING FOLDED LABELS HAVING ROUNDED CORNERS

RELATED APPLICATIONS

This application claims priority of U.S. Provisional Application Ser. No. 06/290,814 filed May 14, 2001.

This application is also related to U.S. patent application Ser. No. 09/603,234 entitled "Method and Apparatus for Production of Labels" now U.S. Pat. No. 6,432,235 B1 patented on Aug. 13, 2002 and Ser. No. 10/143,842 entitled "Method and Apparatus for Production of RF Labels" filed May 14, 2002.

BACKGROUND OF THE INVENTION

1. Field of the Invention

The present invention relates to a method and apparatus for production of folded labels for application to clothing, linens, towels, and other goods, and more particularly to a method and apparatus for producing a label having rounded corners.

2. Description of the Related Art

The attachment of labels to cloth goods such as clothing, linens, and towels is a common practice used to set forth information such as trademarks and trade names, material identification and characteristics, sizes, care instructions, and so forth. Legal requirements necessitate the use of labels in clothing or on linens.

Folded labels are commonly used in the industry and come in a number of different forms including endfolds, centerfolds, J folds, Booklet fold, Manhattan-folds, and mitrefold labels. While each of these different forms has a particular use, the centerfold and end-fold labels are the most popular. FIG. 1 illustrates a centerfold label 2 in a shirt. FIGS. 2–4b illustrate different views of an end fold label of the present invention, while FIGS. 5–7b illustrate different views of a Manhattan fold label of the present invention.

In addition to providing this important information, the label is part of the object. Unfortunately, it is not unusual for a label, especially a skin contact clothing label, to irritate the customer. This can result in the customer forming a negative attitude regarding the quality of the entire garment. Quite often the customer will cut the offending label out of the garment. This not only prevents the customer from having the proper care instructions; it also removes the product identification from the garment, further reducing repeat sales.

Currently most folded labels are produced using what is referred to in the industry as the "cut and fold" technique, that is the labels are indexed, cut from a ribbon of material and then folded. Using this technique about 40–220 labels can be produced a minute with between 5–20% of the labels being considered waste or defective. The most common defect being a distorted fold resulting in the ends (6) of the label (4) not aligning properly, as illustrated in FIG. 8. Other defects include turned corners, fanning, and protruding fold-unders.

Defective labels can significantly increase the cost of the goods. For example, while it costs only about fifteen to twenty-five cents to sew a label into a garment in the United States, it can cost five to ten times this amount to replace a defective label. Many labels, especially centerfold, have a tendency to skew while being sewed, thereby increasing the chance for a poor impression. If the defective label is not detected and replaced, the goods may have to be classified as seconds and sold at a steep discount. Significantly, if the identification of the defective label is missed it is likely to be recognizable by the customer and adversely affect the overall impression of the goods.

It would be desirable to be able to produce folded labels that are more comfortable to the apparel customer than current labels, at a higher speed and greater efficiency of production for both label and end product manufacturers, and with fewer defects than current methods.

There are systems that produce printed labels by first folding a tape imprinted with a label design and then, with a cold knife, cutting the folded tape. Such a system is utilized by Scatto-GI Due's (Italy) CONCORD printer. However, the system employed using the CONCORD unit would not be suitable for used with woven fabrics.

SUMMARY OF THE INVENTION

The present invention has been developed with the view towards substantially changing the way that labels are used and developed. The sequential steps of folding a ribbon of labels, pressing the folded label with heat to set the fold and subdividing the pressed ribbon into individual labels using ultrasonic means results in individual folded labels that are soft to the touch have edges that are generally scratchless to the apparel consumer and virtually free of defects. The improved feel of the labels produced in accordance with the present invention assures that label will remain on the garment when the customer is ready to reorder. Additionally, the use of ultrasonic means to subdivide the labels results in a label having the front and back folds sealed together thus preventing the label from being skewed when sewed into a garment. This makes the sewing step more efficient and results in a reduced number of finished goods being classified as seconds. Thus providing added cost savings to the garment manufacturer. Furthermore, the present invention allows for the production of labels at a rate of from 200 to over 11000 per minute at efficiencies better than 90% at a waste less than 4%. This is significantly higher than the 40–220 labels per minute produced using the current "cut and fold" technique.

The present invention provides a method and apparatus for producing individual folded labels from a ribbon of labels designed to satisfy the aforementioned needs. The label is formed by first providing a ribbon of labels with at least one fold and then subjecting the folded ribbon to heat and pressure to set the fold. In one embodiment, the folded pressed ribbon is indexed and then ultrasonically subdivided into individual labels.

In an alternative embodiment, the folded and pressed ribbon is rerolled and shipped to an end user for use in an auto-sewing device. The present invention further includes an apparatus for carrying out this method as well as labels producing in accordance with the method.

The present invention also provides for insertion of a device such as an antenna, computer chip, radio frequency inventory/antitheft control devices, acoustical, magnetic or other security or inventory devices within the folded label. Such devices may be part of a web or laminate. Alter insertion of the device, edges of the label can be sealed using known techniques, preferably ultrasonics. As will be discussed in more detail below, such a device can be inserted before or after the folding step.

In one embodiment the apparatus of the present invention comprises a folding station and a press station. In a preferred embodiment, the apparatus further comprises a cutting station. The folding station comprises a series of guides that provide the ribbon with at least one folded over portion that when cut will result in a label having the desired configuration. Such configurations include endfold, centerfold, J fold, Manhattan-fold, and mitrefold. See FIGS. 17 and 24. The apparatus of this present invention may have several different folding stations or interchangeable folding stations, thus allowing the user to select different fold configurations. Alternatively, there may be a series of components that function in one overall device. The press and cutting stations are electronically linked by means of at least one sensor to coordinate operation.

In a preferred embodiment, the apparatus of the present invention comprises a tension control assembly to control tension from the roll of ribbon of material through the folding station and into the press unit. In this preferred embodiment, the device further comprises a folding station, press unit, indexing assembly and an ultrasonic cutting station.

The press station of the apparatus of the invention includes a heated platen to subject the ribbon to heat and pressure to lock in the fold and provide the product with a soft feel when polyester or like materials are used. The amount of heat and pressure is selected based on the ribbon material. The press station includes a mechanism for linear advance of the ribbon from the ribbon dispenser through the folding station. The linear advance mechanism can include, for example, a conveyor belt positioned below the platen or a pair of nip rolls positioned downstream from the platen. The folded and pressed label can be rerolled and shipped to an end user for use in an auto-sewing device. Alternatively, the folded pressed ribbon is passed through the indexing assembly and then sent to the cutting station where it is ultrasonically subdivided into individual labels.

In still another embodiment of the present invention, the clearance between the anvil and ultrasonic horn is controlled during cutting, allowing the material to melt and flow therebetween, prior to cutting, improving the bond.

The apparatus can further comprise an insertion assembly to insert a device, such as those discussed above, into the label. The insertion assembly can be positioned before or after the folding station or after indexing. In any embodiment the apparatus can be configured for left or right-hand operation to allow a user to operate more than one unit.

The label produced according to the method of the present invention can also have its corners rounded to improve comfort for the wearer.

In accomplishing these and other objects of the present invention, there is provided a method for producing individual folded labels including the steps of providing a ribbon of labels containing a woven logo or text and folding the ribbon of labels so as to form at least one folded portion. The folded ribbon is subjected to sufficient heat and pressure to set the at least one folded portion. The ribbon of labels is advanced to a cutting device and subdivided into individual folded labels with an ultrasonic cutting device. Immediately prior to cutting the labels the ultrasonic cutting device is paused at a predetermined location to allow the material to partially melt and flow prior to being cut.

There is also provided a label-making apparatus including a dispenser for a ribbon of labels. A mechanism for linear advance advances the ribbon of labels which contain a woven logo or text. A folding station is positioned adjacent the dispenser to provide at least one folded over portion. A press station is positioned adjacent the folding station for providing pressure and heat to the ribbon. A cutting station including ultrasonic means subdivides an individual label from the ribbon of labels. The ultrasonic means include an ultrasonic horn and an anvil separated by a predetermined space. A sensor in communication with the linear advance mechanism controls the advance of a length of the ribbon of labels to provide proper spacing between cut-edges and a logo on the label. Means adjust the ultrasonic means to control the space between the ultrasonic horn and anvil to allow the material of the ribbon of labels to be advanced into the space, partially melting the material prior to cutting.

These and other objects, features, aspects, and advantages of the present invention will become more apparent from the following detailed description of the preferred embodiment relative to the accompanied drawings, in which:

BRIEF DESCRIPTION OF THE DRAWINGS

FIG. 10 is a side view of the apparatus of FIG. 9.

FIG. 11 is a top view of the apparatus of FIG. 9.

FIG. 18 is a side view of an alternative embodiment of the present invention.

FIG. 19 is a top view of the embodiment of FIG. 18.

FIGS. 20A, 20B and 20C illustrate an arrangement of folding rods used to produce an end fold.

FIG. 38 is a front view of a device for melting the corners of the label of FIG. 36.

FIG. 39 is a front view of another embodiment of a heating device for rounding the corners of an endfold label.

DETAILED DESCRIPTION OF PREFERRED EMBODIMENTS

Figure 9:
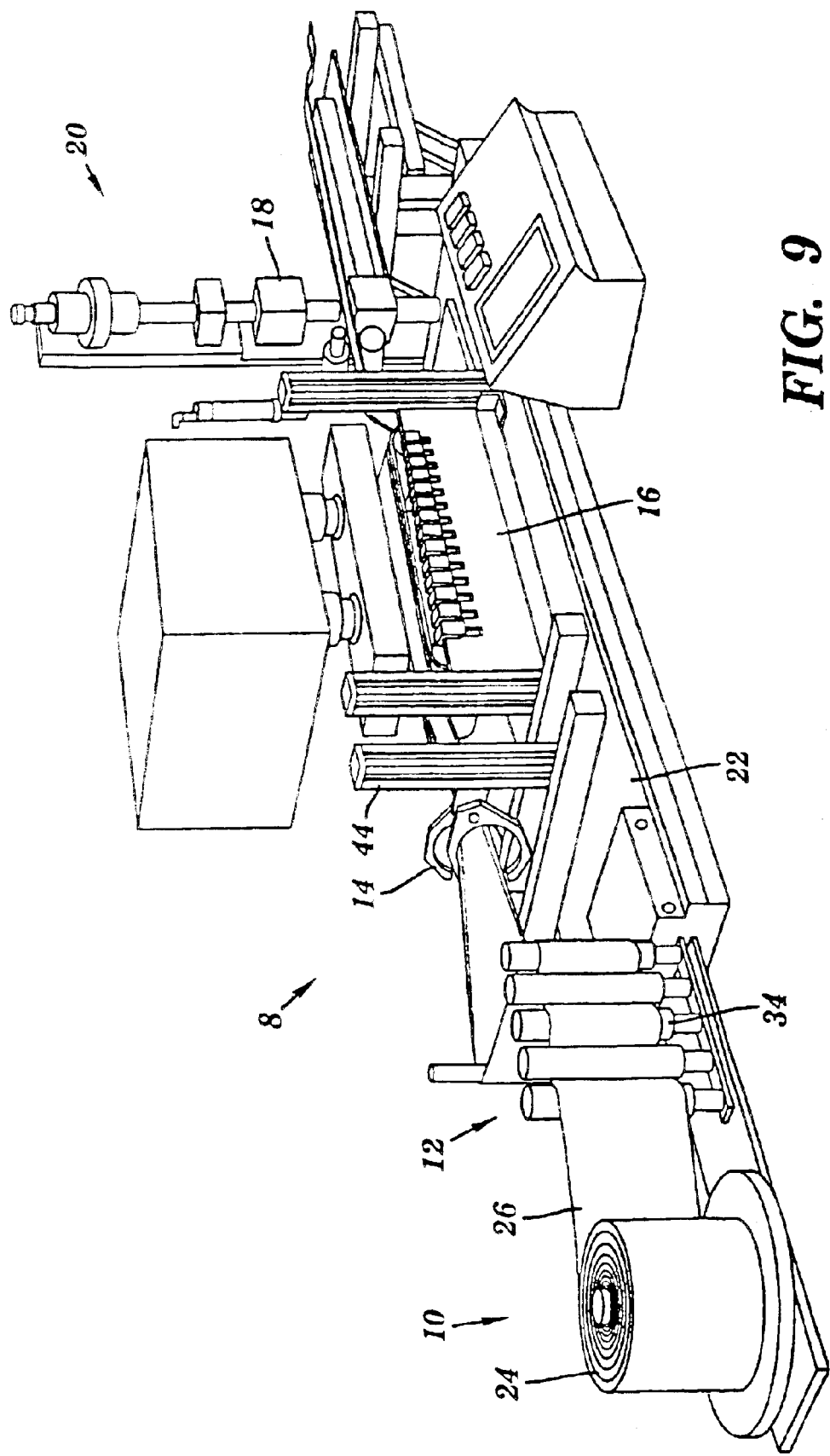
FIG. 9 is a perspective view of an apparatus for producing a centerfold label according to a method of the present invention.

Referring now to the drawings, and more particularly, to FIG. 9, there is shown a perspective view of a label producing apparatus of the present invention, in the centerfold configuration, generally designated 8, which comprises one embodiment of the present invention. The apparatus of the embodiment of FIG. 9 comprises a tension let-off device 10, a tension equalizer assembly 12, a folding station 14, a pressing station 16, indexing assembly 18 and a cutting station 20 mounted on a base or table 22.

As shown in FIG. 9, a roll 24 of a ribbon of material containing labels 26 is placed on tension let-off device 10. Regulating tension from let-off device 10 to press station 16 is important for controlling the ribbon of material 26 during the folding process. As shown in FIG. 10, the upper edge 28 and lower edge 30 of the material 26 must be maintained at essentially equal tensions. The centerline 32 of material 26, as shown in FIG. 10, is the main control for this adjustment. Centerline 32 is preferably setup equal to the centerline of the press unit 16 and the folding station 14. Raising or lowering the roll 24 from this point can be done to equalize the tensions in the upper and lower edge of the material.

The ribbon of material 26 can be composed of virtually any material that can be cut and pressed including a thermoplastic material (e.g., polyester), acetate, cotton, nylon, linen, paper, rayon and combinations thereof, in woven and non-woven form. Polyester is preferred. The labels can be printed or woven. Woven is preferred.

It is preferred that the logo of the label is made such that it is 90 degrees from the typical orientation used in broadloom, needeloom or shuttleboom weaving of woven labels. For woven labels this can be readily done on existing harness repeats. The change of orientation greatly reduces "window shading" (i.e., curling after laundering) and decreases shrinkage when the product is exposed to heat at temperatures above 275° F.

As shown in FIGS. 9, 10 and 11 the ribbon of material 26 is then guided through a series of adjustable equalizing rollers 14 that make up the tension equalizer assembly 12, to provide an even distribution of tension. After emerging from the equalizing rollers, the ribbon is guided over a folding rod 36. It is preferable that the location of folding 36 be kept in center with folding lenses 38 and 40 along centerline 32. The folding rod 36 is square to base 22. Material angle 42 (FIG. 5) is kept from 5°–170°, more preferably 30°–90°. The distance from folding rod 36 to press unit 16 is dictated by the loom cut width of the material being folded. The wider the tape/ribbon cut, the further folding rod 36 is located from press unit 16.

After passing over the folding rod 36, the ribbon of material 26 enters folding station 14. For producing a centerfold label, as shown in the embodiment of FIGS. 9, 10 and 11, the folding station 14 comprises two folding lenses 38 and 40. The folding lenses can be seen most clearly in FIG. 12. Folding lenses 38 and 40 are pivotally mounted on supports 44 and can be adjusted vertically. The lenses are a caliper-like device comprising two adjustable jaws 46. The lenses restrain and guide the material into an even consistent fold. Lens 38 is a guiding lens used for making for slight adjustments before the material enters lens 40, the working lens that brings the ribbon to a fold. In certain situations a proper fold can be obtained using more or less that two lenses.

Figure 13:
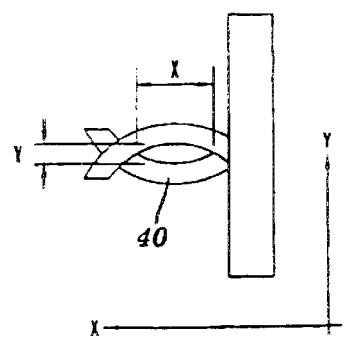
FIG. 13 illustrates a detailed view of a folding lens of the apparatus.

As illustrated in FIG. 13, it is preferred that the distance x on lens 40 be ½ of the loom cut width +1.5 mm or −1.5 mm depending on the thickness and stability of the material being processed. The Y distance should allow for even flow of material. Changing lenses to a larger or smaller diameter may be necessary for widths over 120 mm or below 50 mm.

Figure 1:
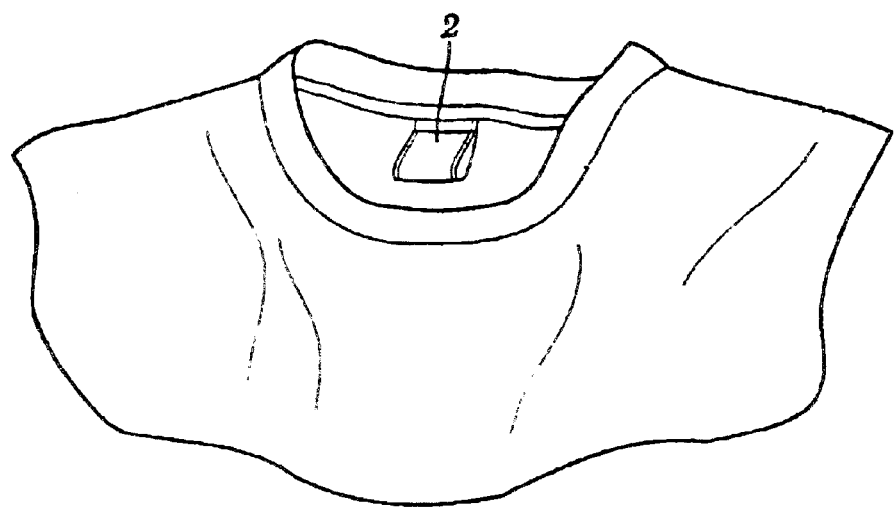
FIG. 1 illustrates a centerfold label 2 in a shirt.
Figure 8:
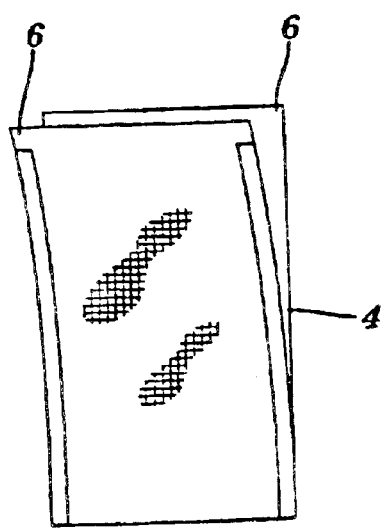
FIG. 8 illustrates a centerfold label having a distorted fold.

Movement of lens 40 in the "+" x-axis (FIG. 8) direction will create a larger top fold. Movement of lens 40 tn the "−" x-axis direction will create a larger bottom fold. Placement of the y-axis for both lens 38 and 40 is along centerline 32 (FIG. 10). If the material has a tendency to twist, then an angle downward or upward may be set on either lens.

Figure 12:
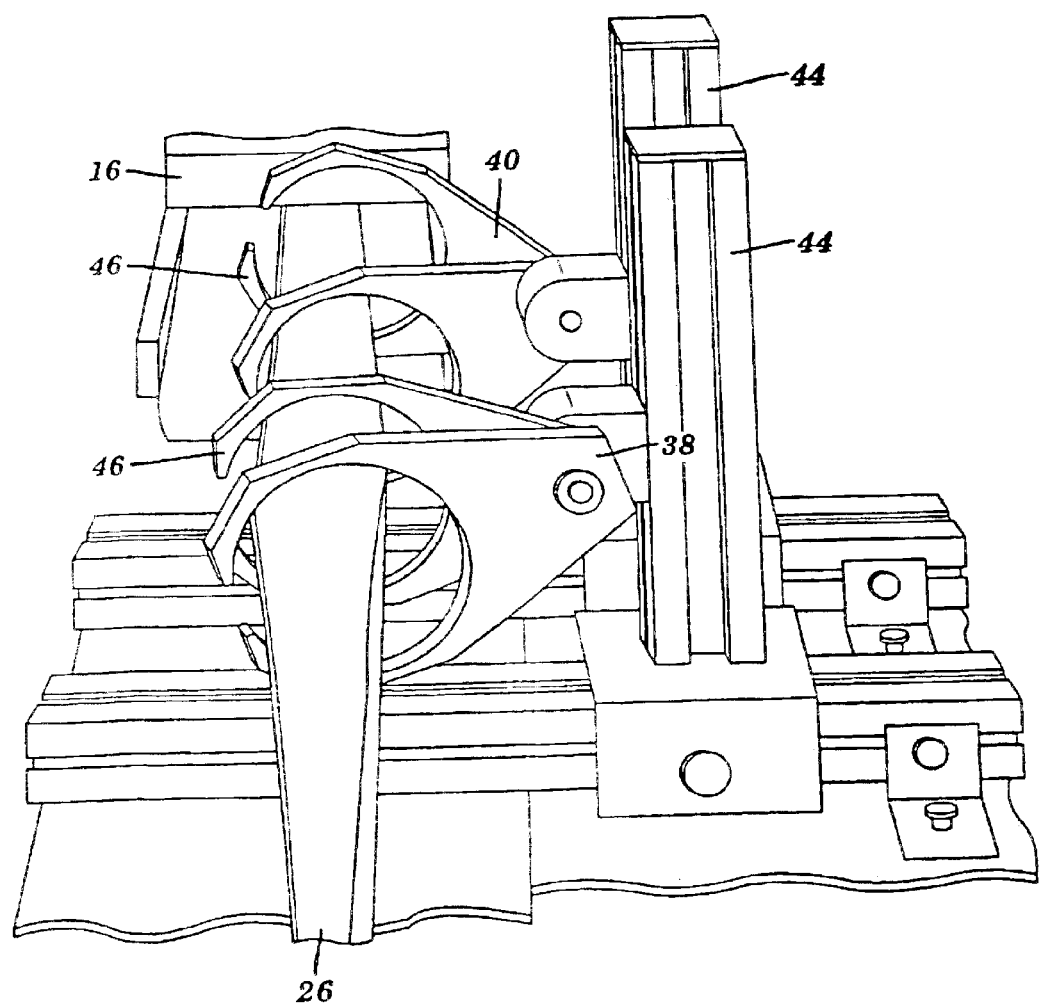
FIG. 12 is an end view of the left side of the apparatus of FIG. 9 showing a ribbon going through the folding station into the press unit.
Figure 14:
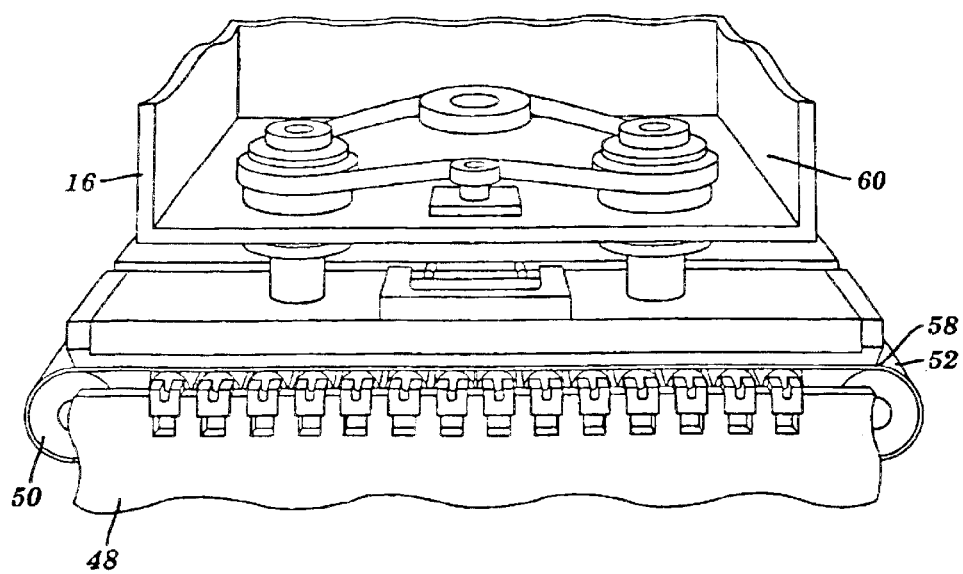
FIG. 14 is a front view of the press station of the embodiment of FIG. 9.
Figure 15:
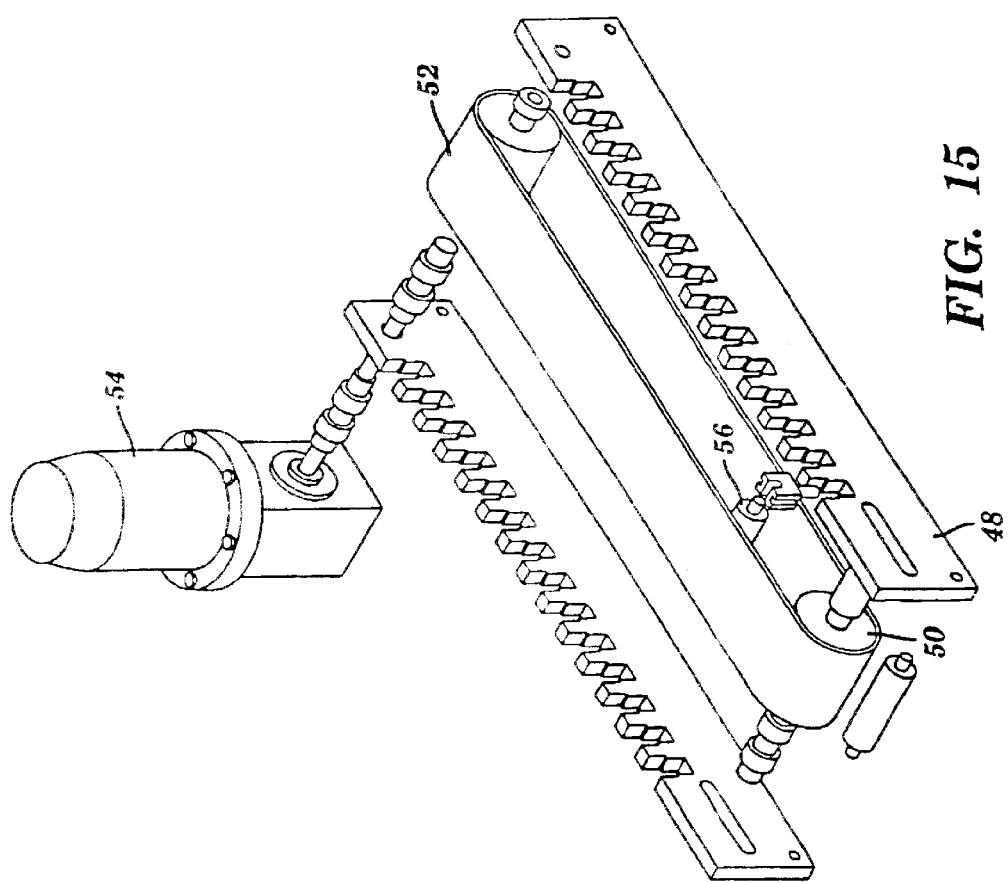
FIG. 15 is an exploded view of the conveyor drive mechanism of the press station of the embodiment of FIG. 9.

As can be seen in FIG. 12, the folded material exits the folding station 14 and enters press station 16. The press station 16 subjects the folded material to both heat (100°–400° F.) and pressure. A range of pressure between 5–80 pounds of force is preferred. As illustrated in FIGS. 14 and 15. in one embodiment the press unit includes a support frame 48 (part of which has been cut away in the figure to show details) upon which are movably affixed belt rolls 50, about which is positioned a high temperature resistant endless conveyor belt 52. The belt may be driven at selected, controlled, constant speeds by known means such as an AC or DC electric drive motor 54 and speed regulator or controller. Between the affixed belt rolls 50 are a series of rollers 56, spring mounted to the support frame, upon which the top of the conveyor rides.

As shown in FIG. 14., mounted above the conveyor belt 52 is a platen 58 affixed to a motor driven screw gear actuating mechanism 60 by which the platen 58 may be moved upward and downward. The platen is heatable by means of electrically energized calrods or other known heating devices attached to a heat control unit (not shown).

Figure 16:
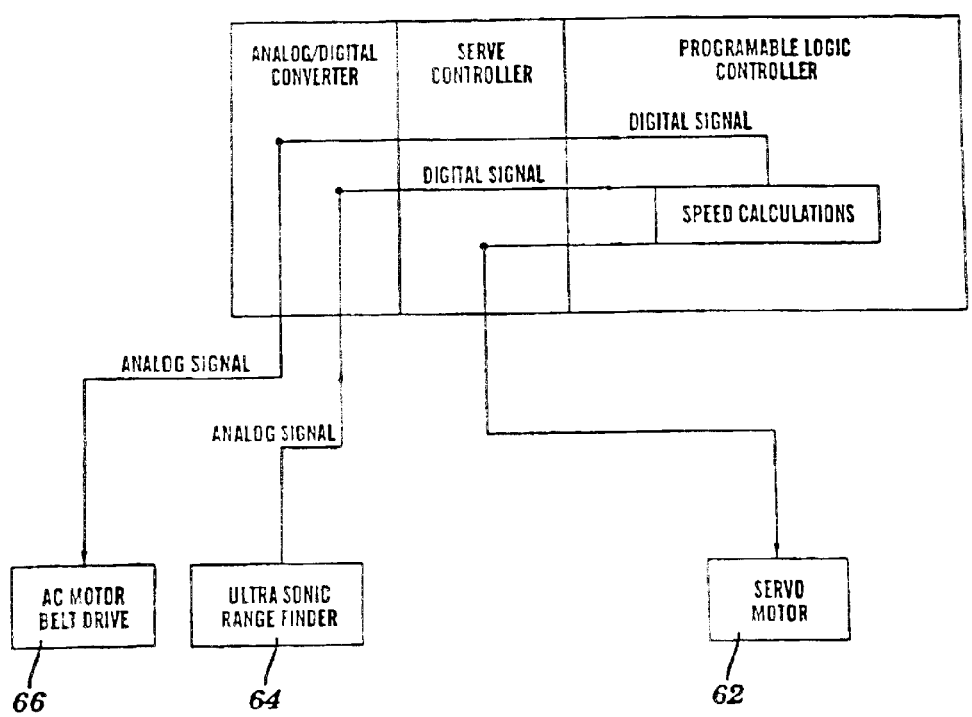
FIG. 16 is a diagram of a representative speed control system.

The speed of the press station motor can be trimmed with an ultrasonic rangefinder that is wired into the motor controller inside the unit. A diagram of a representative speed control system is illustrated in FIG. 16. In FIG. 16, a speed signal is sent to the servomotor 62. From this signal a calculation is made and held in memory. The ultra sonic range finder 64 makes a reading of the slack of material as it travels between press station 16 and cutting station 20

(FIG. 9). This is added to the number held in memory and this sum is sent to the belt drive motor 66 to control belt speed.

The press station 16 can have multiple heat zones that can be controlled separately. The first heat zone can be designed to carry most of the heat and the heat zones can be designed as a cool down area. The settings of the press station 16 are dictated by the type of material being processed. Thicker materials require a higher press setting and more heat, while thinner materials require less.

In the embodiment depicted in the figures, the folded material travels though the press unit via a conveyer mechanism, depicted in more detail in FIG. 15. It is this conveyor mechanism that provides a linear advance pulling the ribbon from the tension let off device 10 through the folding station 14. Other mechanisms for linear advance can be used.

Figure 17:
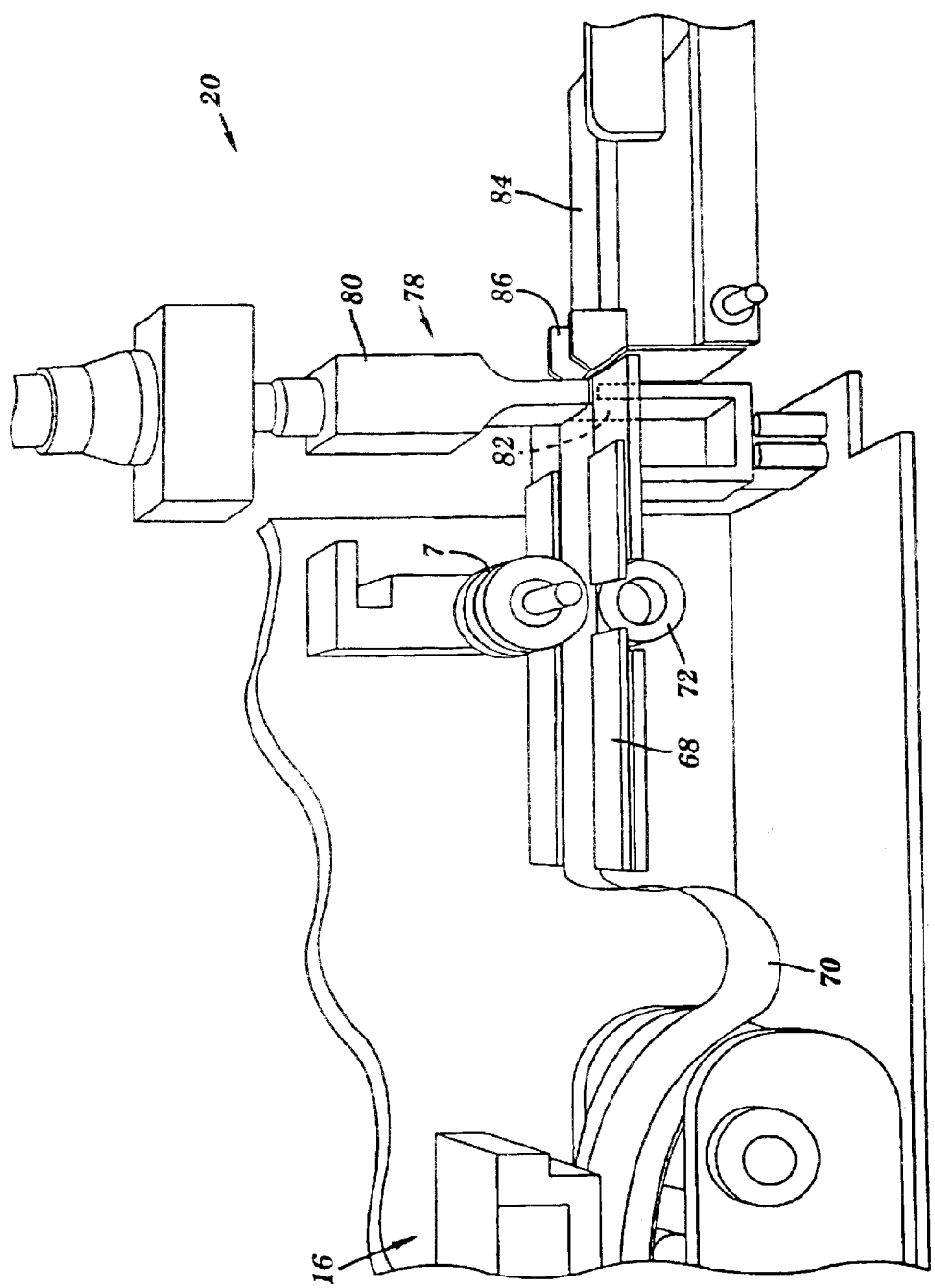
FIG. 17 is a perspective view of the indexing assembly and cutting station of the embodiment of FIG. 9.

As shown most clearly in FIG. 17, the folded pressed ribbon exits the press station and is led to the cutting station on support plate 68. A range sensor 64 shown in FIG. 10, is used to monitor the slack 70 of the material 26 between press 16 and plate support 68 and through a control unit, the speed of press 16 is trimmed to stay consistent with the advancing material and the delays set for cut time and acceleration and deceleration of the servo motor (not shown) that turns drive roller 44.

As shown in FIG. 17, upon advance of the material, downward pressure from roll 74 is dependent on material thickness, and structure. Thinner, looser structure materials require low pressure. Thicker and more stable structures of material require a higher downward pressure.

As shown in FIG. 10, to maintain the proper alignment for materials with logos and written instructions, such as woven or printed labels, an observation system such as a fiber optic eye 76 is used, which reads color contrast as material advances past its read point. The material advances accelerating from a full stop. When a registration point passes under eye 76 or when eye 76 sees a color change an immediate interrupt signal is sent to the controller, at this point the servo motor, via roller 72, advances the material the distance set in the operator interface. The deceleration is calculated so that the material advance will be accurate to +/−0.05 mm. At this point the material remains stopped for the cutting, e.g., knife delay time set on the operator interface. The material then advances and follows the same sequence above.

A typical setting for the advance is the width of the label (length along loom cut edge) minus 5 mm. This number may be adjusted to influence centering of the logo. Additional adjustment can be made if necessary.

In the embodiment depicted in the figures, particularly FIG. 17, the material is cut at the cutting station 20 to form folded labels using an ultrasonic system 78 comprising a horn 80 and anvil 82. For example, ultrasonic horn 80 has sound waves moving through it at a frequency of 20 KHz. The residence of these waves can be magnified through proper booster and horn combination.

The anvil 82 is actuated at an adjustable pressure to collide with horn 80. The material 26 passes between horn 80 and anvil 82 and is exposed to very high-localized heat, cutting and sealing the material. The larger the radius on anvil 82 the larger the seal area and the more pressure required for a cut. The default delay time for the knife up is calculated and taken into account. For example, a typical delay is 70 ms, which may be adjusted if necessary to accomplish the desired results. Ultrasonic rotary dies can also be used.

The cutting station can utilize other known cutting techniques to subdivide the ribbon into individual labels. Such techniques included, for example, cold or hot shearing knives, hot fuse knives that squeeze off the product during cutting, extreme high mechanical pressure, high-pressure air, high-pressure water, laser cutting, rotary die cutters, and others.

Figure 32:
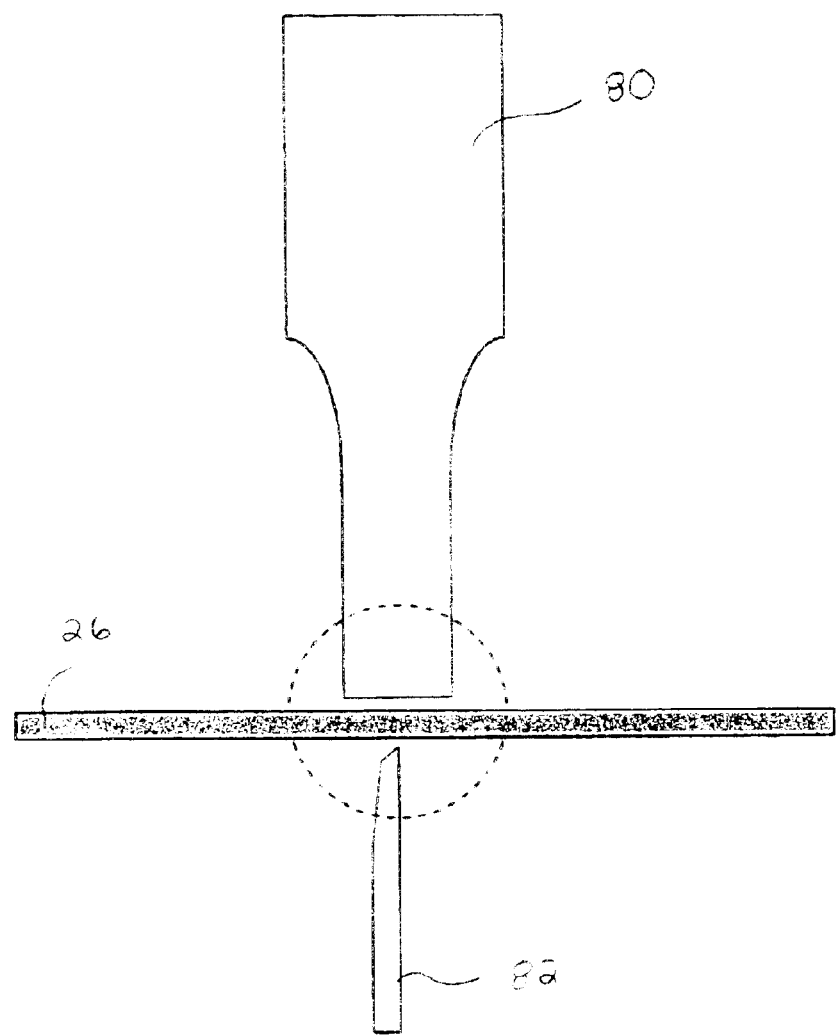
FIG. 32 illustrates a cutting assembly used in the apparatus and method of the present invention.
Figure 33:
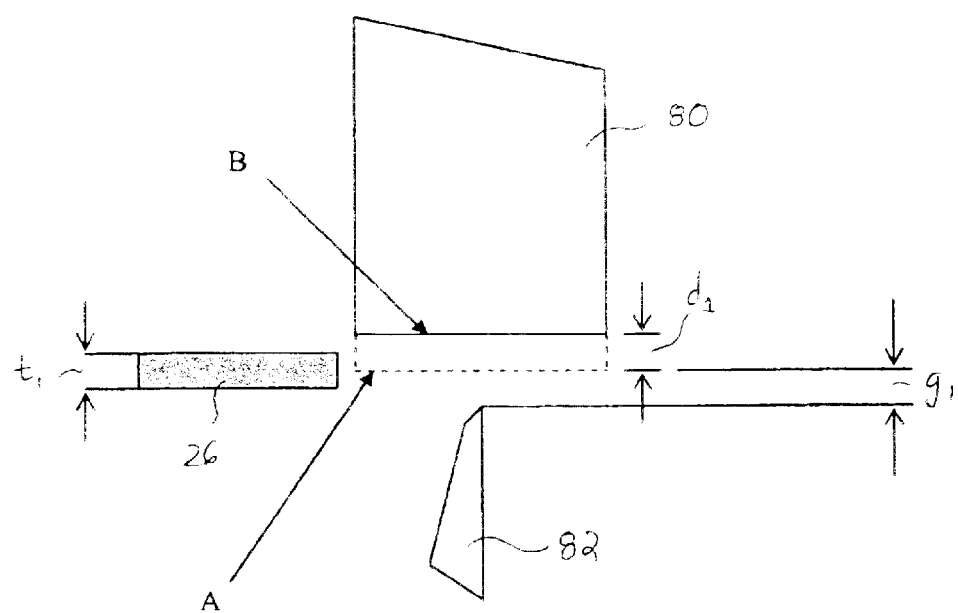
FIGS. 33 and 34 are enlarged views illustrating the clearance between the horn, material and anvil of FIG. 32.
Figure 34:
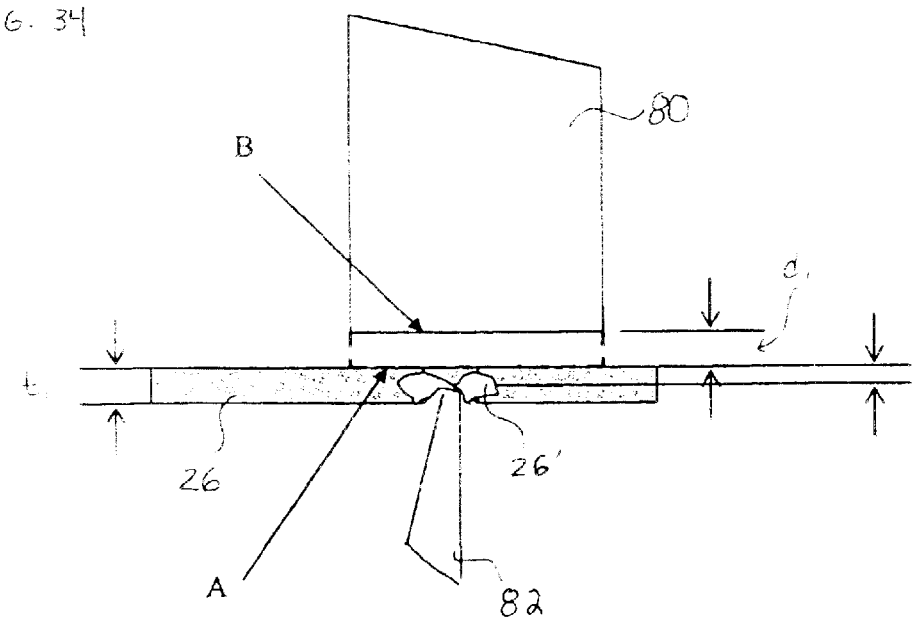
Figure 37:
FIG. 37 is a cross-section of the label of FIG. 36 taken along line 1-2.

A superior seal, bond and cut can be obtained with the ultrasonic horn and cutting anvil by way of a controlled clearance and zero clearance between the horn and anvil. Referring to FIGS. 32–34, the ultrasonic horn 82 resonates at a controllable distance, by way of amplitude gain controls. This physical displacement resonates at a given frequency, i.e., 20 Khz, the horn will change its physical dimensions approximately 20,000 times per second, resonating between points A (controlled clearance) and B (zero clearance), as shown in FIGS. 33 and 34. This distance change d, is controllable and predictable. Material 26 has a given thickness $t_1$ and density with certain tolerances. Prior to cutting a gap $g_1$ exists between anvil 82 and point A. Thus, the advance stroke of the anvil is paused at a predetermined location, point A, to allow the material to partially melt and flow, and then advance to point B to cut or subdivide the label.

The anvil has a radius at its cutting edge, determined by the density of the material. The anvil uses controlled linear, incremental motion obtainable by use of a servo motor and cam motion. It should be appreciated that other equivalent means can be used. Ultrasonic means can adjustably control the stroke of the anvil to stagger or delay the same to allow for material flow.

Depending upon the demands of the end product, the ultrasonic system is adjustable as follows. A typical weld time is, for example, 65 ms, and the material thickness is, for example, 1 mm. During the first 35 ms of the weld/cut, the anvil is brought to the anvil location of, for example, 0.25 mm, leaving a 0.25 mm gap or space $g_2$ remaining between point A and the anvil. The material is forced into this space, experiencing heat from the frequency of the horn motion and pressure from the material being forced into this location ¼ its thickness. Since the gap is not closed at this point, the material is allowed to melt and flow, as shown at 26' in FIG. 33. This location is held for a given time.

The gap $g_2$ is then closed to a zero clearance point and the cut/bond/weld is completed via the horn motion and pressure from the anvil location being in essence a zero distance from point A. It should be appreciated that the anvil and horn do touch in practice, however, the amount of wear to the horn and anvil created from metal to metal contact is dramatically reduced saving set up time and parts.

The main purpose of this method is to allow the material time to flow once it has been melted. In existing applications the anvil will penetrate through the material at a progressive rate as it melts through the material, not allowing the material time to flow in its melted state.

As shown in FIG. 17, after cutting the finished label 84 proceeds to packer 86. Packer 86 then pushes the label 84 into a packing box. Packing of the cut labels can also be accomplished by bagging or placing the goods in boxes through any number of methods including single column stacks in horizontal or vertical orientation, curved stacker trays, or magazine devices in a rotary or sliding configuration.

Figure 24:
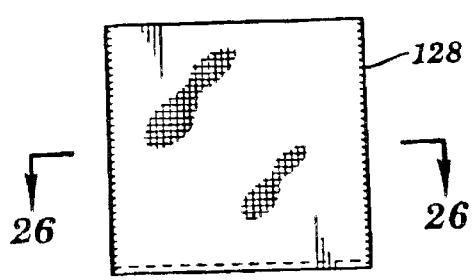
FIG. 24 is a front view of a centerfold label.
Figure 25:
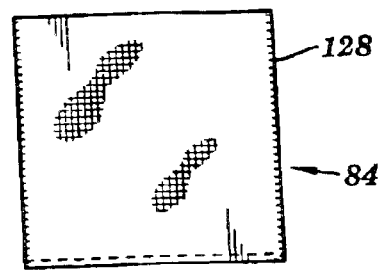
FIG. 25 is a back view of the label of FIG. 24.
Figure 26:
FIG. 26 is a cross sectional view of the label of FIG. 24 taken along line 26—26.

FIGS. 24, 25 and 26b set forth a centerfold label 84 produced in accordance with the method and apparatus of the present invention. Unlike centerfold labels produced using traditional techniques, the centerfold label of the present invention has the front and back folds sealed together along edge 128.

Figure 36:
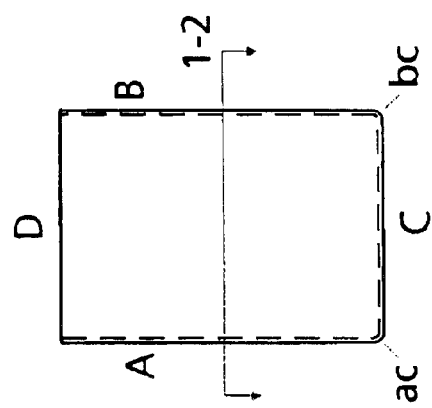
FIG. 36 is a front view of a centerfold label having rounded corners.
Figure 35:
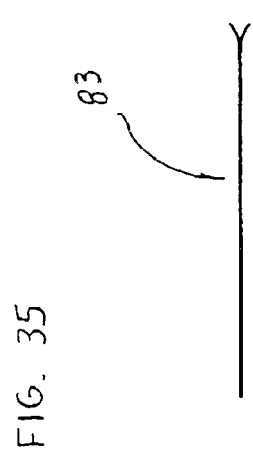
FIG. 35 illustrates a known anvil cutting device for rounding corners of a label.

Referring to FIGS. 35–40, a label having rounded edges can be produced to prevent further discomfort for the consumer. One manner of rounding the label edges is shown in FIG. 35, whereby the knife 83 of the ultrasonic anvil is curved at its end in the manner shown. Such a shaped device is disclose in U.S. patent application Ser. No. 09/603,234. Knife 83 can produce a label as shown in FIG. 36. Although, the use of a special knife is a proven method it is inherent to additional tooling problems. Melting down the corners has been shown to be more practical.

As illustrated in FIG. 36, the label includes edges A and B which have been folded and bonded according to the method of the present invention, open edge D and folded edge C. The corners ac and bc are rounded in order to prevent discomfort when in contact with the skin.

Referring to FIGS. 38 and 39, the use of localized heat can be applied to the corners ac and ab, causing them to melt back as shown in FIG. 36. A ceramic block 150 is positioned at folded edge C to support and register the fabric and maintain low heat absorption. A pair of temperature controlled heating blocks 152 are positioned at edges ac and bc. Blocks 152 can be masked with silicon or another non-stick film to prevent adhesion of the fabric during the melting process. The melting process can occur after the cutting phase and/or during the packing phase.

The temperature of blocks 152 can be controlled at different levels depending upon the density of fabric used and the speed at which the machine is running (controlling the dwell time). For example, a temperature range should be from about 125° C. to 250° C. An ultrasonic device, such as a 40 Khz horn can be used to melt the material as well.

Figure 41:
FIG. 41 is a cross-sectional view of the label of FIG. 40 taken along line 2—2.
Figure 40:
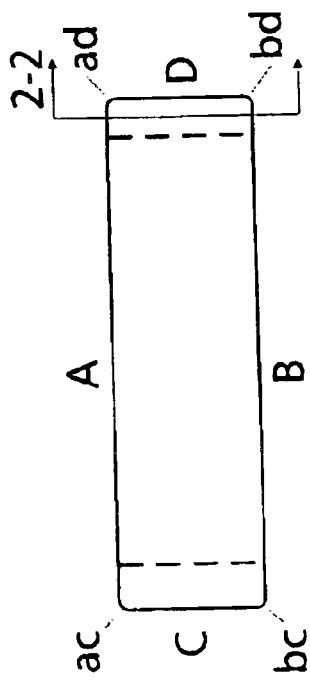
FIG. 40 illustrates an endfold label having rounded edges.

The corners ac, bc, ad, bd of an endfold label, as shown in FIGS. 40 can also be rounded using temperature blocks. The label is sealed along edges A and B (FIG. 41) and folded along edge C and D, such that the folded edges from the back side are boded to the edges of the front side. As shown in FIG. 39, a ceramic block 150 is positioned at each edge A, B to support and register the fabric and maintain low heat absorption. A pair of temperature controlled heating blocks 152 are positioned at each edge C and D to round the corners.

All the components may be assembled in a single device, or may be associated together as separate components, within a system.

As discussed above, by using an alternative folding stations, the apparatus of the present invention can be used to form other varieties of folded labels. For example, FIGS. 18–22 depict modifications to the folding station of the embodiment of FIG. 9 to form "end-fold" labels (FIGS. 2–4).

As shown in FIGS. 18 and 19, the material 26 is distributed from tension roll 10 and passed through folding station 14. In this embodiment, the folding station 14 is comprised of folding rods 88 and holder foot 90 that keeps the fold closed before it enters the press station 16.

The folding rods are illustrated in more detail in FIGS. 20A–20C. In FIGS. 20A–20C fold rod 92 holds unfolded material in position. Fold rod 94 begins the fold along the edges. Fold rod 96 completes the fold. Fold rods 98 and 100 work the fold in place. The folded material then enters press station 16 and is processed as above.

Figure 2:
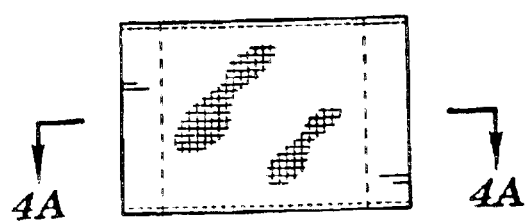
FIG. 2 is a front view of an end fold label.
Figure 3:
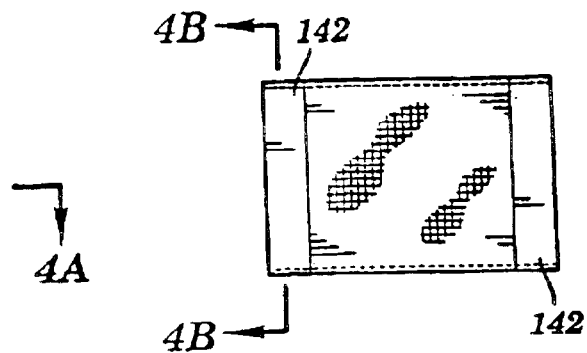
FIG. 3 is a back view of the label of FIG. 2.
Figure 4A:
FIG. 4A is a cross sectional view of the label of FIG. 2 taken along line 4A—4A.
Figure 4B:
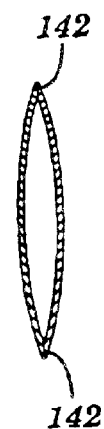
FIG. 4B is a cross sectional view of the label of FIG. 3 taken along line 4B—4B.
Figure 21:
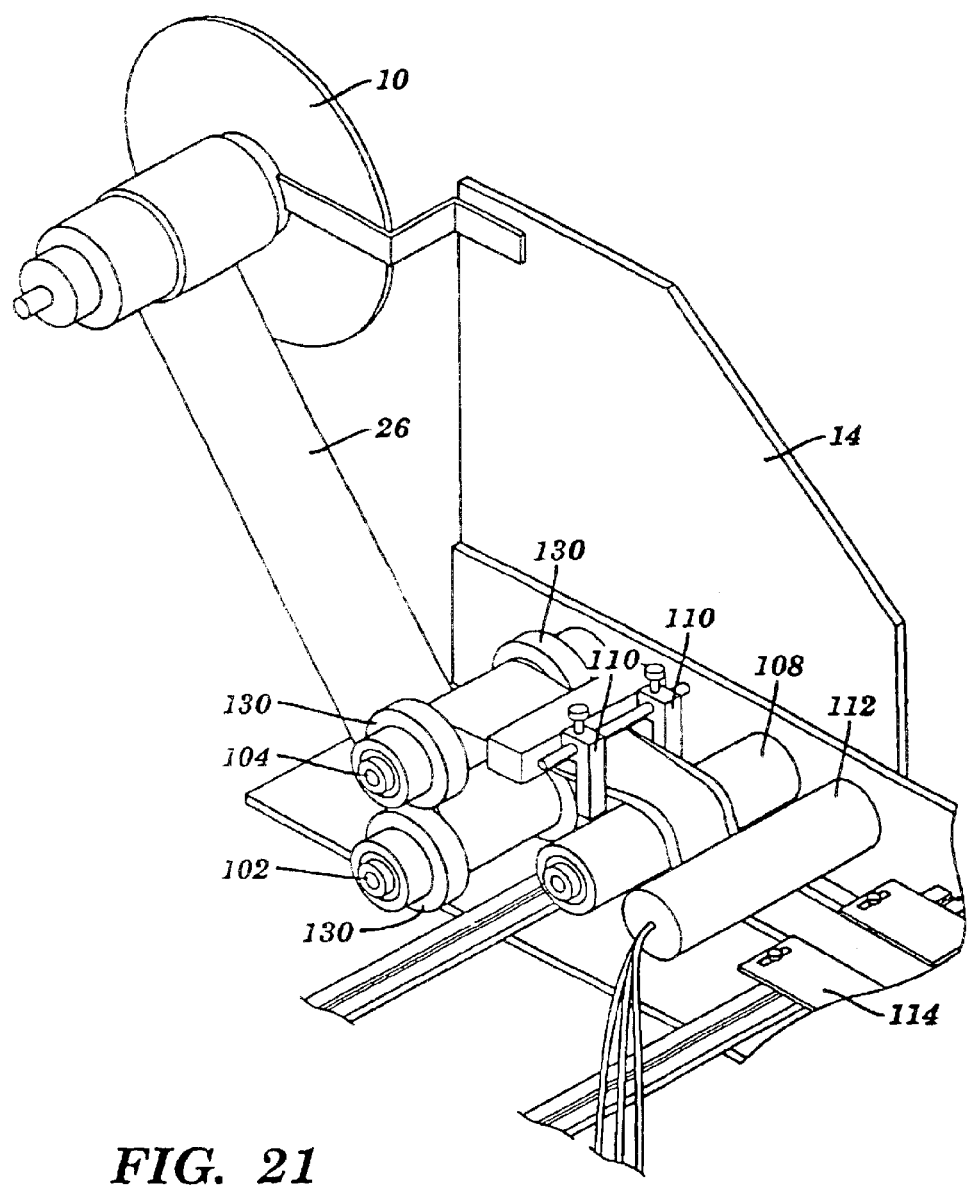
FIG. 21 is a perspective view of an apparatus of the present invention for producing end-fold labels.
Figure 22:
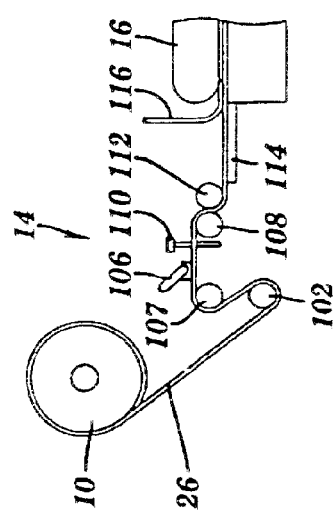
FIG. 22 is a side view of the embodiment of FIG. 21.

FIGS. 21 and 22 show another modification to the folding station that can be used to form an "end-fold" label (FIGS. 2–4). As shown in FIGS. 21 and 22, the material 26 is distributed from tension roll 10 and passed through folding station 14. In this embodiment, the folding station 14 is comprised of services of guide rollers 102–108 and fold pins 110. Guide rollers 102 and 104 position the ribbon of material 26. Adjustable guides 130 (FIG. 22) on rollers 102 and 104 are moved into the material edge. Guide roller 106 (FIG. 22) exerts pressure on the center of the material to prevent the ribbon from puckering in the center. Folding pins 110 fold the edges of the fabric and roller 108 holds the fold. Heat roller 112 presets the fold (100° C.–145° C.). As illustrated in FIG. 22, guide 114 holds the fold in place before the folded ribbon enters the press station 16. The press station 16 can be equipped with a hold-down spring 116 to maintain the fold in place when the press is lifted. The apparatus further includes a cutting station as depicted in FIGS. 9 and 17.

FIGS. 2, 3, 4A and 4B show various views of an end fold label produced in accordance with the method and apparatus of the present invention. The present invention results in front and back folds sealed together along edge 142.

Figure 5:
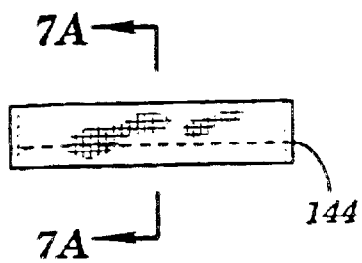
FIG. 5 is a front view of a Manhattan fold label.
Figure 6:
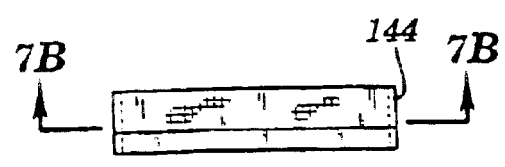
FIG. 6 is a back view of the label of FIG. 5.
Figure 7A:
FIG. 7A is a cross sectional view of the label of FIG. 5 taken along line 7A—7A.
Figure 7B:
FIG. 7B is a cross sectional view of the label of FIG. 6 taken along line 7B—7B.
Figure 27:
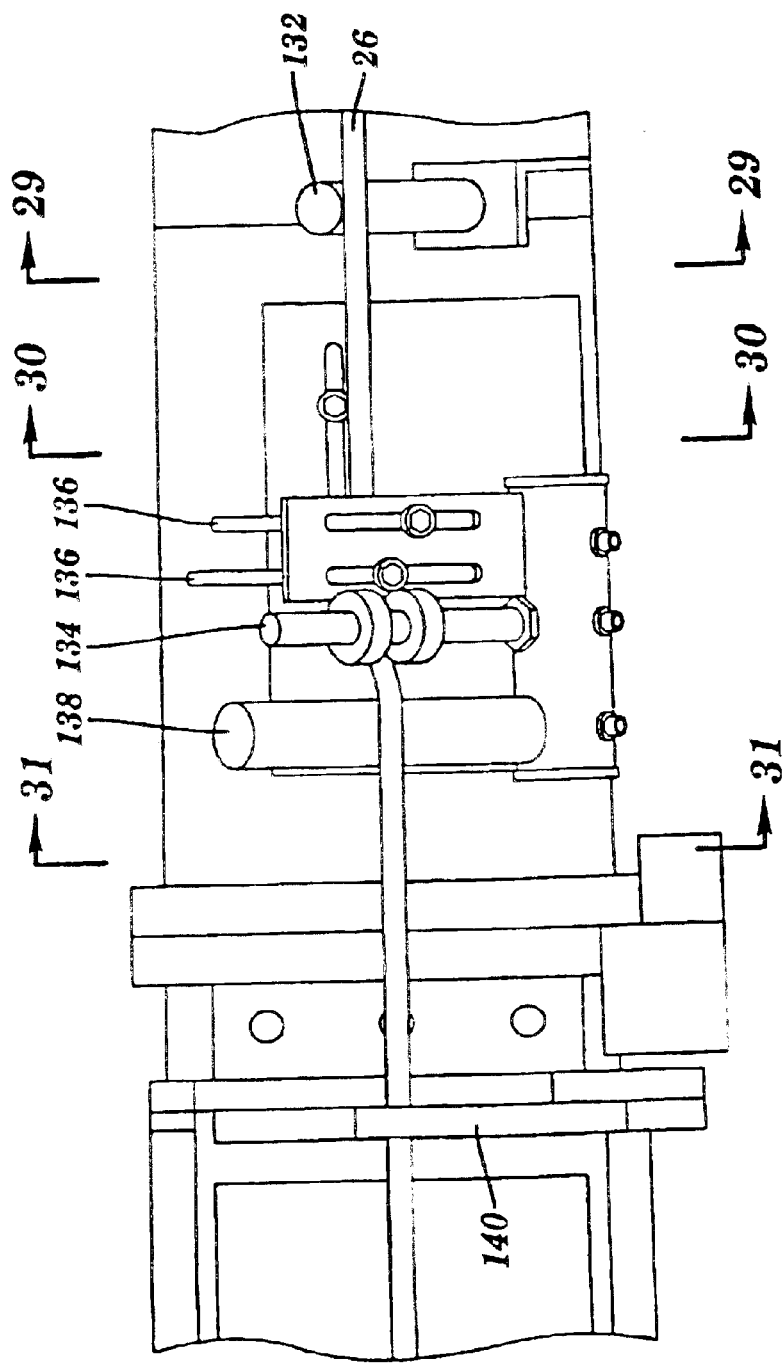
FIG. 27 is a top view of an apparatus for forming Manhattan fold labels according to the method of the present invention.
Figure 28:
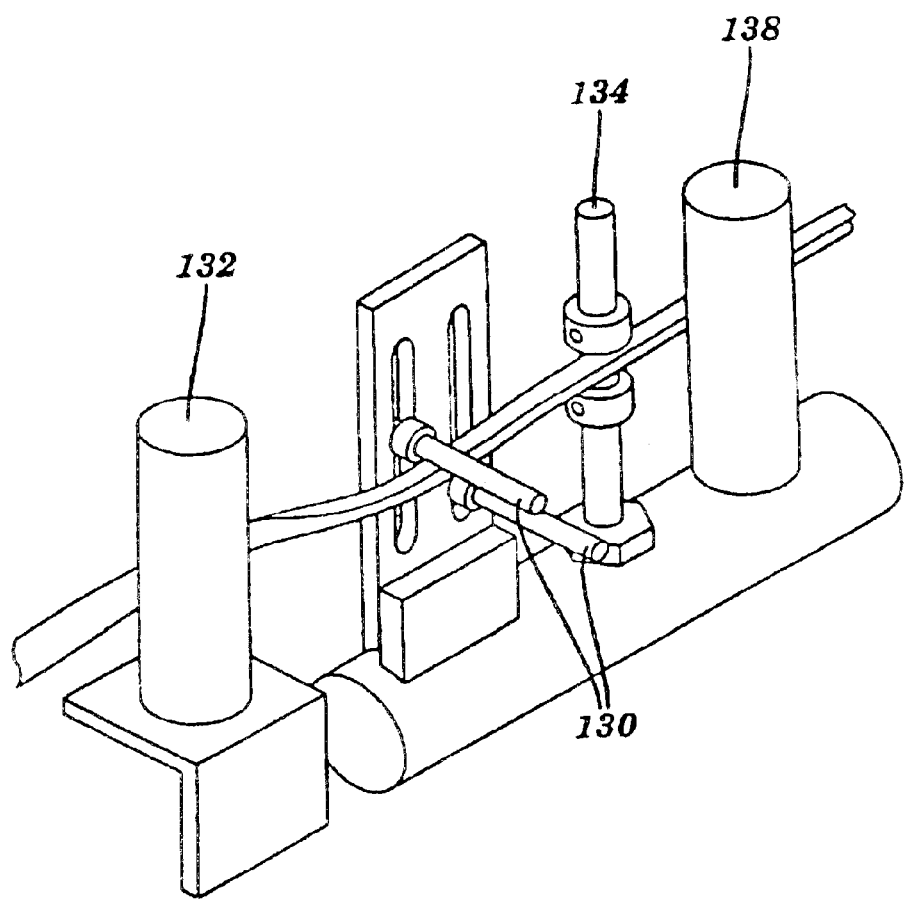
FIG. 28 is a perspective view of the reverse side of the apparatus of FIG. 27.
Figure 29:
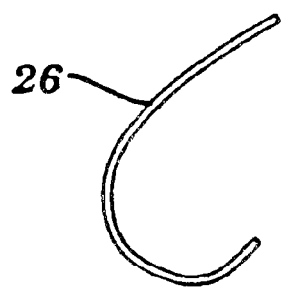
FIGS. 29, 30 and 31 are cross sectional views of ribbon 26 as it travels through the folding station of the apparatus of FIG. 27.
Figure 30:
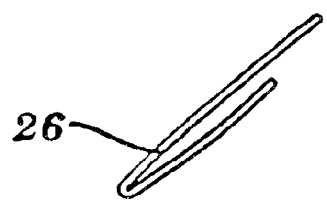
Figure 31:

FIGS. 27 and 28 depict a modification in the folding station to form Manhattan fold labels (FIGS. 5–7). In this embodiment, the folding station is comprised of several folding rods and at least one folding lens. In use, the ribbon of material 26 exits the tension let-off device (not shown). The ribbon is over folded on the top edge by folding rod 132 (FIGS. 29 and 30). Through tension, the back fold rod 134 begins the top fold which folds around to the back. Guide rods 130 and 136 bring the fold into place. The folded ribbon then travels behind support rod 138 and through folding lens 140 that maintains the fold and lines up the fabric with the press station 16 (not shown). FIGS. 29. 30 and 31 show a cross section of ribbon 26 as it travels through the folding station. The apparatus further includes a cutting station as depicted in FIGS. 9 and 17.

FIGS. 5, 6, 7A and 7B depict various views of a Manhattan fold label produced in accordance with the present invention. The label is unique in that the cut sides are bonded and sealed along edge 144.

As noted above, the resultant labels have a unique smooth feel based upon the process used to make them. Furthermore, thermoplastic ribbon of labels, preferably a woven polyester, is subdivided using an ultrasonic system as part of the claimed apparatus, the labels are unique in that the cut sides are bonded or welded together as illustrated in FIGS. 2–7, 24–26, 38 and 40. As noted above, this bonding not only prevents the label from being skewed when sewed into a garment, but also provides the edges with a generally scratchless feel.

Figure 23:
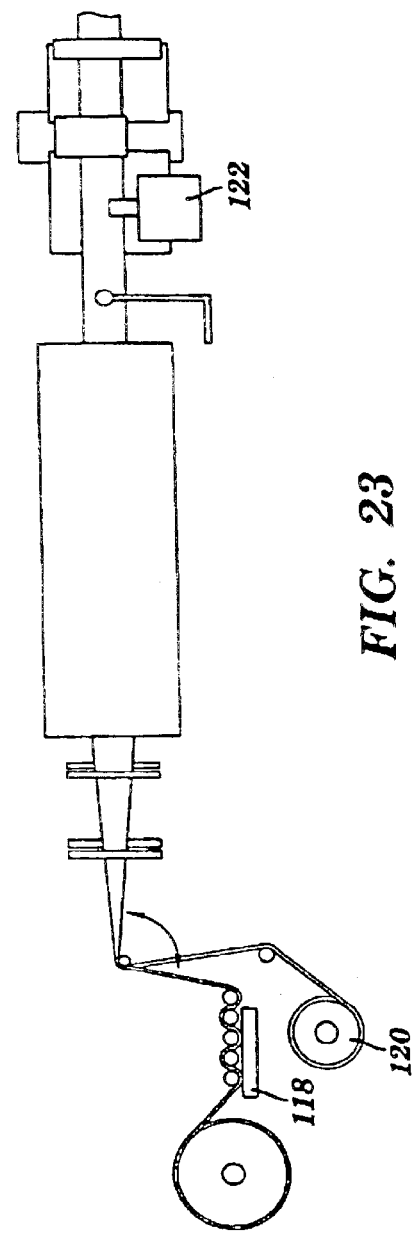
FIG. 23 is a top view showing examples of positions that inventory/security devices can be inserted into labels.

The apparatus of the invention is particularly suited for insertion of devices such as security and inventory control devices, e.g., radio frequency inventory devices (RFID) tags, into labels. RFIDs are known in the art and include that disclosed in U.S. Pat. Nos. 5,874,902; 5,874,896; 5,785,181; and 5,745,036. As illustrated in FIG. 23, such devices can be inserted at number of locations including, but not limited to locations 118, 120 and 122. Location 120 represents such devices on a reel or roll to be distributed during the fold process. Using an ultrasonic cutting system these devices can be sealed into the bonded top and bottom edges of the material. This will cause the label to be destroyed if the device is removed; thus guaranteeing the tag and label stay as one during processing. At location 122 the folded material is opened and the device is inserted at desired positions. At location 118 adhesive backed devices are be placed on the material before folding. Edge sealing can be achieved with these methods as well.

The apparatus of the present invention can be modified at any point to include various accessories. A vision system can be included to inspect the logos and image on the material as it passes. Labels with errors caused are detected and removed automatically.

Additionally, the apparatus can be modified such that the cutting station the corners of the cut material are removed to provide for heightened comfort. Further, the apparatus can be modified to ultrasonically seal the open loom cut edge giving a centerfold label, for example, three ultrasonically sealed edges and one folded edge.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A method for producing individual folded labels comprising the steps of:
    a) providing a ribbon of labels;
    b) folding the ribbon of labels so as to form at least one folded portion;
    c) subjecting the folded ribbon to sufficient heat and pressure to set the at least one folded portion;
    d) advancing the ribbon of labels to a cutting device;
    e) sensing a spacing between cut-edges and a logo on the label;
    f) pausing and controlling the advancement of the ribbon of labels at a predetermined location;
    g) allowing the material to partially melt and flow; and
    h) ultrasonically subdividing the ribbon of labels into individual folded labels with an ultrasonic cutting device.

2. The method of claim 1, wherein the cutting device includes an ultrasonic horn and an anvil separated by a predetermined space, and further comprising the step of adjusting the size of the space to allow the material to melt and flow into the space prior to cutting.

3. The method of claim 2, further comprising the step of reducing the space to a zero clearance point to subdivide the ribbon of labels into individual folded labels having cut edges, and wherein the cut edges are sealed and bonded together.

4. The method of claim 3, further comprising the step of rounding the corners of the cut edges of the folded label.

5. The method of claim 4, wherein the corners of the cut edges are rounded by applying heat thereto to melt the same.

6. A label-making apparatus comprising:
    a dispenser for a ribbon of labels;
    mechanism for the advance of the ribbon of labels;
    folding station positioned adjacent the dispenser for providing at least one folded over portion;
    press station positioned adjacent the folding station for providing pressure and heat to the ribbon;
    cutting station including ultrasonic means for subdividing an individual label from the ribbon of labels, the ultrasonic means including an ultrasonic horn for partially melting the ribbon of labels and an anvil being separated by a predetermined space;
    sensor in communication with the advance mechanism for controlling the advance of a length of the ribbon of labels to provide proper spacing between cut-edges and a logo on the label; and
    means for pausing and adjusting the ultrasonic means to control the space between the ultrasonic horn and anvil to allow the material of the ribbon of labels to be advanced into the space, partially melt and flow prior to cutting.

7. The apparatus of claim 6, wherein the means for adjusting the ultrasonic means comprises a control mechanism for advancing and pausing the advance stroke of the anvil to control the space between the horn and anvil.

8. The apparatus of claim 7, further comprising means for rounding the corners of the cut edges of the label.

9. The apparatus of claim 8, wherein the means for rounding the corners of the cut edges of the label comprise at least one pair of temperature controlled heating blocks positioned at cut edges of the label.

10. The apparatus of claim 6, wherein the space can be reduced to a zero clearance point to subdivide the ribbon of labels into individual folded labels having cut edges, and wherein the cut edges are sealed and bonded together.

* * * * *